United States Patent [19]
Quenot

[11] 3,838,520
[45] Oct. 1, 1974

[54] TAPE MEASURE
[75] Inventor: Michel Quenot, Besancon, France
[73] Assignee: Stanley Mabo, Besancon, France
[22] Filed: May 12, 1972
[21] Appl. No.: 252,751

[52] U.S. Cl. .................................. 33/138, 35/62
[51] Int. Cl. ......... G01b 3/00, G01b 3/10, B43l 1/12
[58] Field of Search ............... 33/138; 35/61, 62, 63

[56] References Cited
UNITED STATES PATENTS
2,669,791   2/1954   Watkins .................................. 35/66
3,149,426   9/1964   Kaeyer .................................... 35/66
3,672,597   6/1972   Williamson ............................ 35/62

Primary Examiner—William D. Martin, Jr.
Assistant Examiner—Steven L. Stephan
Attorney, Agent, or Firm—Robert E. Burns;
Emmanuel J. Lobato; Bruce L. Adams

[57] ABSTRACT

A tape measure includes a case including an auxiliary outer wall slidably mounted outside and spaced apart from one lateral wall. A plate slidably mounted between these walls carries sheets forming an inscription device, the sheets being accessible through a window in the outer wall in a rest position of the plate to enable inscription, and means being provided for removing inscriptions as the plate is withdrawn.

5 Claims, 4 Drawing Figures

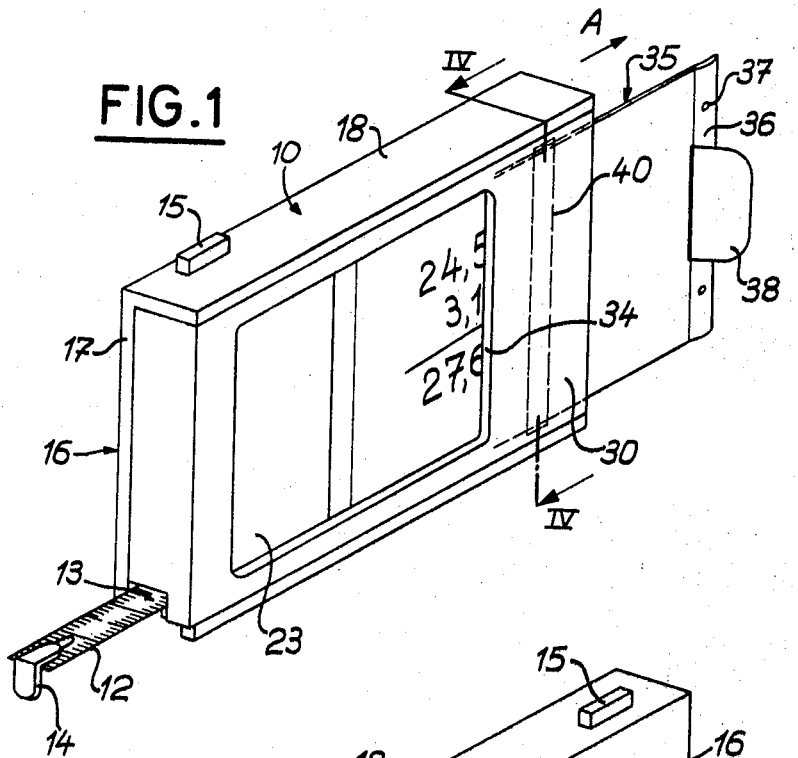

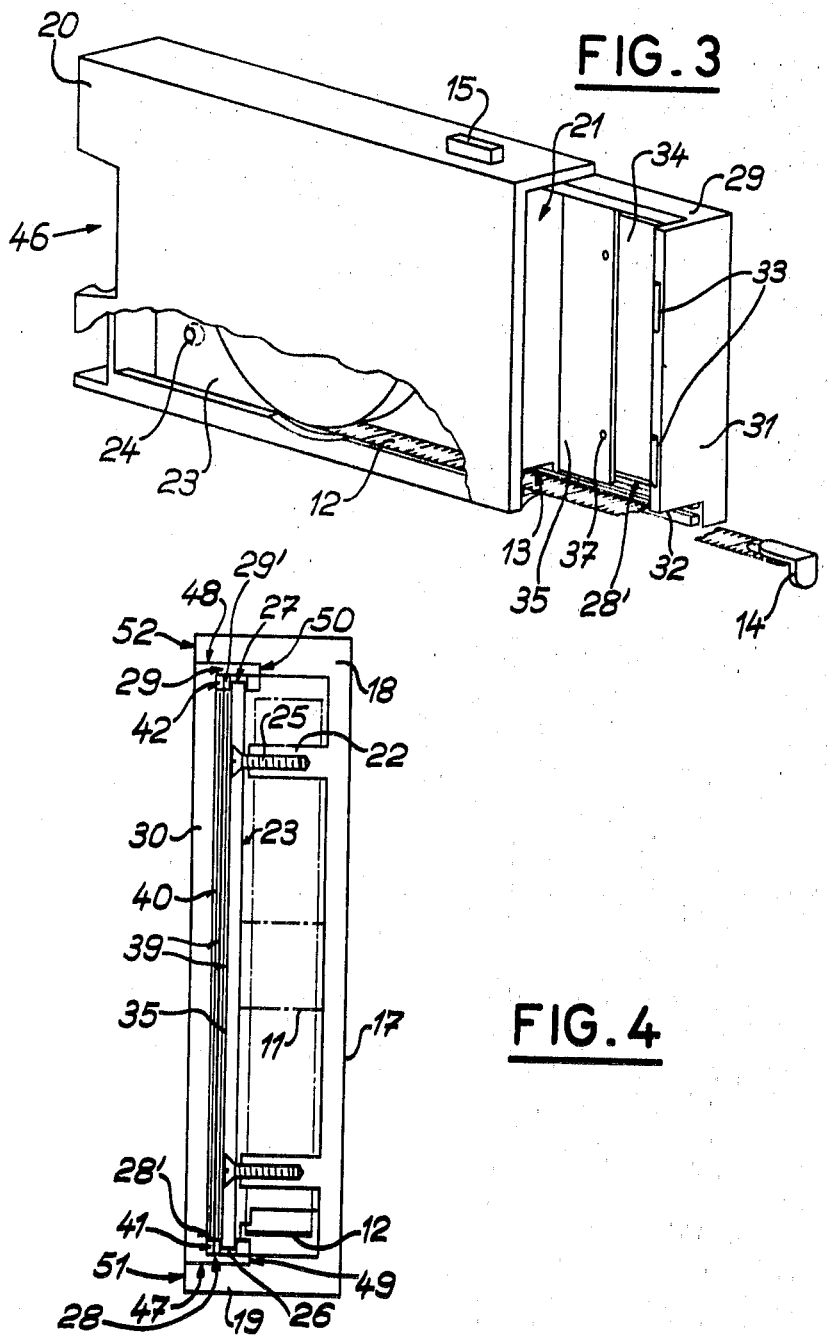

TAPE MEASURE

This invention relates to tape measures including a graduated tape wound on a drum in a case.

Such tape measures are well-known but when it is desired to mark a measurement or a series of measurements taken, or to carry out simple arithmetic operations in connection therewith, the user normally has to resort to other means, such as a pencil and a separate sheet of paper.

A known attempt to overcome this drawback consisted in associating with the tape measure a device for printing the measured distances on a paper tape. However, this known arrangement is bulky and complicated, hence uneconomical, and is incompatible with the requirements of simple design with ease of handling.

It is therefore an object of the invention to provide a tape measure comprising means enabling the user, for example, to mark measured distances and to efface the markings at will.

According to the invention, a tape measure comprises a case including a pair of fixed spaced-apart lateral walls, a graduated tape wound on a drum rotatably mounted between said lateral walls about an axis perpendicular to the lateral walls, a tape-withdrawal aperture in the case, an outer wall slidably mounted outside and in parallel spaced-apart relationship to one lateral wall of the case, means for releasably holding the outer wall in a fixed position against sliding movement relative to the case, a window in the outer wall, a plate slidably mounted between the outer wall and said one lateral wall from a first position under the window to a second withdrawn position, means for removably displaying impressed inscriptions being disposed on the surface of said plate accessible through the window when the plate is in the first position, and means for effacing inscriptions on the display means when the plate is moved from the first position to the second position.

An embodiment of the invention will now be described, by way of example, with reference to the accompanying drawings, in which:

FIGS. 1 and 2 are isometric perspective views of a tape measure according to the invention;

FIG. 3 is a partially cut away isometric perspective view of the tape measure of FIGS. 1 and 2, during assembly of the case; and FIG. 4 is a cross-section taken along line IV—IV of FIG. 1.

The tape measure shown comprises a case 10 having a pair of spaced-apart lateral walls 17 and 23, a drum 11 rotatably mounted between the walls 17 and 23 about an axis perpendicular to these walls, and a graduated flexible steel tape 12 wound on the drum 11. The tape 12 can be withdrawn through an aperture 13 in the case 10 against the action of a spring or other return device (not shown), a catch 14 being provided at the free end of the tape to facilitate taking measurements and to prevent return of the free end of the tape through the aperture 13. A conventional one-way tape locking device (not shown), including a push-button 15, normally prevents retraction of the withdrawn tape 12, but when the press-button 15 is actuated the tape is freed and automatically winds onto the drum 11 under the action of the return device.

The case 10 comprises a main body 16 of moulded synthetic plastics material, including said lateral wall 17, top and bottom walls 18 and 19 respectively, and inset end walls 20 (FIG. 2) and 21 (FIG. 3). The top and bottom walls 18, 19 include opposed parallel bearing surfaces 47, 48 respectively extending longitudinally of lateral wall 17 and defined between shoulders 49, 50 parallel to and facing away from the wall 17 and extreme edges 51, 52 of the top and bottom walls respectively. The body 16 additionally comprises four inner tapped appendices 22 and a shaft (not shown) perpendicular to the wall 17 and about which the drum 11 is rotatably mounted.

The lateral wall 23 is in the form of a metal plate provided with four holes 24 and is secured to the main body 16 by means of screws 25 threadably engaging in the appendices 22. The upper and lower edges of the wall 23 are spaced apart from and parallel to both the opposed bearing surfaces 47, 48 and the shoulders 49, 50 of the top and bottom walls 18, 19, and form therewith top and bottom sliding channels.

An outer wall 30 includes a pair of opposed parallel edges with flanges 28, 29 extending therealong and protruding from and perpendicular to an inner face thereof, the opposed in side faces of the flanges 28, 29 including opposed longitudinal grooves 26, 27 equally spaced-apart from said inner face by shoulders 28, 29, which flanges are slidably received along said top and bottom sliding channels with the grooves 26, 27 cooperating with the top and bottom edges of the wall 23 to hold the outer face of the wall 30 flush with the extreme edges 51, 52 of the top and bottom walls 18, 19.

This wall 30, provided with a rectangular window 34, is moulded in synthetic plastics material in one piece with an end section 31 which is adapted to closely fit in a housing defined between the end wall 21 and the protruding ends of the walls 17, 18 and 19, when the flanges 28, 29 are fully slid along their respective sliding channels to bring the wall 30 to a fixed position, as shown in FIGS. 1 and 2, the wall 30 being prevented from sliding beyond this position by abutment of the section 31 against the end wall 21. Wall 30 has a cutout 32 of corresponding shape to the aperture 13, and protuberances 33 which, in said fixed position, are adapted to clip into corresponding recesses inside the end of wall 17 to securely, but releasably, hold the wall 30 in this position against sliding movement relative to the main body 16 and the remainder of the case 10. In the space between the inner face of the wall 30 and the outer face of the plate 23 is slidably mounted a rectangular metal plate 35 having bent over end portions 36. Over the front surface of the plate 35 are secured, by means of embossements 37, three superimposed sheets schematically represented at 39, FIG. 4, namely: a dark coloured backing sheet, a thin translucent intermediary sheet of sturdy tracing-type paper, and a smooth transparent outer protecting sheet, for example of a synthetic plastics material. The backing and intermediate sheets are such that where a pressure is applied against the outer sheet, they mutually adhere thus leaving a visible trace which can be removed by separating the backing and intermediary sheets. For this purpose, a strip 40 is disposed transversally between the backing and intermediate sheets and has protruding end parts resting in recesses in the form of notches 41, 42 in said shoulders 28', 29'. The plate 35 is additionally provided with a flexible tab 38, secured under an end portion 36.

The sheets 39 form a device for removably displaying inscriptions impressed thereon, which inscriptions can be removed by pulling the plate 35 from a rest position in which the sheets 39 are accessible through the window 34 to a withdrawn position, as schematically indicated by arrow A in FIG. 1. When the plate 35 is in its rest position, the left-hand (looking at FIG. 1) end portion 36 engages between the inner face of wall 30 and the plate 23 so as to prevent unwanted sliding of the plate 35 from this position.

The inset end wall 20 has an outward projection 43 with a lip 44 by means of which a pointed cylindrical inscription member 45 can be clipped in a housing defined between the walls 17, 18, 19 and 20, which housing is accessible from outside the case 10. The wall 17 is provided with a cut-away 46 to facilitate removal of member 45 from its housing.

The described display device may conveniently be used to note measurements taken using the tape 12, or to carry out simple arithmetic operations in connection with measurements taken, by employing the pointed end of member 45 to impress inscriptions on the sheets 39 with the plate 35 in its rest position. To remove inscriptions, the plate 35 is simply withdrawn by pulling the tab 38, and then replaced in its rest position.

Assembly of the display device and the tape measure is greatly simplified by use of the auxiliary slidably mounted outer wall 30. The display device is entirely independent of the tape drum 11 and its associated mechanism, and can be easily replaced, should the sheets 39 become worn out or damaged.

The outer surface of the wall 23 forms an effective publicity support, or could alternatively be used to carry useful data.

What is claimed is:

1. A tape measure comprising:
  a. a case comprising parallel lateral walls including top and bottom walls and end walls integral with a first rectangular lateral wall, means defining a tape withdrawal aperture in one of said end walls, said top and bottom walls each having one of a pair of opposed mutually parallel shoulders extending in a longitudinal direction of said first rectangular lateral wall, said shoulders defining substantially parallel opposed lateral bearing surfaces on said top and bottom walls between said shoulder and an edge of the top and bottom walls respectively, another lateral wall secured between the bearing surfaces with top and bottom edges of said another lateral wall disposed parallel to and spaced from said bearing surfaces and said shoulders respectively to define therebetween top and bottom sliding channels;
  b. a drum rotatably mounted between said lateral walls about an axis perpendicular to the lateral walls;
  c. a graduated tape wound on said drum;
  d. an outer wall including a pair of opposed parallel edges with flanges extending therealong and protruding therefrom substantially perpendicular to an inner face of said outer wall, opposed inside faces of said flanges comprising means defining longitudinal grooves equally spaced from said inner face of said outer wall, said flanges being received along said sliding channels with said grooves engaging said top and bottom edges of said second lateral wall to hold the outer face of the outer wall flush with the edges of the top and bottom walls, said outer wall having means defining a window therethrough;
  e. a plate slidably mounted between said outer wall and said case and slidable from a first position under said window to a second position extending from said case;
  f. means for removably displaying impressed inscriptions disposed on a surface of said plate and accessible through said window when said plate is in said first position;
  g. means for effacing said inscriptions on said display means as said plate is moved from said first position to said second position; and
  h. means for releasably holding said outer wall in a fixed position from sliding relative to said case and for releasing said outer wall to slide relative to said case.

2. A tape measure according to claim 1, in which said outer wall includes an integral end wall protruding from and perpendicular to said inner face of the outer wall along an edge of the outer wall perpendicular to said pair of opposed parallel edges, a housing defined between said second lateral wall and said top and bottom walls for receiving said end wall when the outer wall is slid along the sliding channels to bring the outer wall to said fixed position, a member included in said housing for stopping further sliding of the outer wall beyond said fixed position, and bosses included in said end wall and recesses included in said housing for releasably holding the outer wall in said fixed position against sliding movement relative to the case.

3. A tape measure according to claim 2, in which said second lateral wall and said top and bottom walls include, towards an end opposite to said housing, means defining a second housing accessible from outside the case, said second housing including means for removably securing a substantially cylindrical pointed inscription instrument.

4. A tape measure according to claim 1, in which the means for removably displaying inscriptions include a pair of superimposed sheets carried by said plate, said sheets being mutually adhesive at locations where they are pressed together so as to display impressed inscriptions, said means for effacing inscriptions including a strip disposed between said sheets transversal to the direction of sliding of the plate and protruding from opposite edges of said sheets, and said case includes means for receiving protruding parts of said strip and for holding said strip stationary relative to the case during movement of the plate between the first and the second positions, for separating adhering parts of the sheets as said parts of the sheets pass by the strip.

5. A tape measure according to claim 4, in which said flanges of said outer wall are each provided with a shoulder for separating an inner face of said outer wall from said grooves, and said means for receiving protruding parts of the strip are notches each disposed in a shoulder of one of said flanges of the outer wall.

* * * * *